United States Patent
Sekino et al.

[11] Patent Number: 6,076,269
[45] Date of Patent: Jun. 20, 2000

[54] STEERING WHEEL CENTERING TOOL

[75] Inventors: Hiroshi Sekino; Yoshiharu Miyamoto, both of Novi, Mich.

[73] Assignee: Anzen of America, Inc., Novi, Mich.

[21] Appl. No.: 09/021,972

[22] Filed: Feb. 11, 1998

[51] Int. Cl.$^7$ .................................................. G01C 9/02
[52] U.S. Cl. .............................................. 33/371; 33/600
[58] Field of Search ........................... 33/370, 371, 372, 33/373, 335, 533, 600, 203

[56] References Cited

U.S. PATENT DOCUMENTS

| | | | |
|---|---|---|---|
| 1,294,856 | 2/1919 | Willis | 33/371 |
| 2,021,667 | 11/1935 | Miess | 33/373 |
| 3,091,862 | 6/1963 | MacMillan . | |
| 3,161,964 | 12/1964 | Myles | 33/370 |
| 3,277,579 | 10/1966 | Murphy | 33/372 |
| 3,624,915 | 12/1971 | Wilkerson . | |
| 3,813,932 | 6/1974 | Wallace . | |
| 3,889,527 | 6/1975 | Wallace . | |
| 3,980,999 | 9/1976 | Nishioka et al. . | |
| 4,007,357 | 2/1977 | Yanagishima . | |
| 4,133,115 | 1/1979 | Stockholm | 33/371 |
| 4,335,523 | 6/1982 | Bryant | 33/371 |
| 4,342,279 | 8/1982 | Seko et al. . | |
| 4,485,371 | 11/1984 | Yamada et al. . | |
| 4,679,327 | 7/1987 | Fouchey et al. . | |
| 4,690,557 | 9/1987 | Wiklund . | |
| 4,893,413 | 1/1990 | Merrill et al. . | |
| 5,105,546 | 4/1992 | Weise et al. | 33/600 |
| 5,507,098 | 4/1996 | Schaver, Jr. | 33/371 |
| 5,855,072 | 1/1999 | Nakaho | 33/600 |

FOREIGN PATENT DOCUMENTS

| | | |
|---|---|---|
| 28 30 257 | 7/1978 | Germany . |
| 55-128401 | 9/1980 | Japan . |

OTHER PUBLICATIONS

Kemkraft Engineering, Inc., "Clear Vision Dual Inclinometer Box and Clear Vision Set Tool" Instruction Manual, Livonia, MI. (No Date).

*Primary Examiner*—G. Bradley Bennett
*Attorney, Agent, or Firm*—Marger Johnson & McCollom P.C.

[57] ABSTRACT

A vehicle steering wheel centering apparatus comprising an electronic or mechanical leveling device for sensing a deviation in the position of the steering wheel from a centered position and a housing mounted to the vehicle steering wheel for supporting the leveling means. A first arm received in the housing has, at its terminal end, a cam rotatable about a first axis. A second arm received in the housing and coaxial with said first arm has, at its terminal end, a cam rotatable about a second axis parallel to said first axis. In the alternative, the cams are fixed but include a sliding surface adapted to contact and slide along the inner surface of a steering wheel rim when inserted thereagainst. The spring biases the first arm so that the terminal end of the first arm is forced away from and in a coaxial direction with the second arm. The apparatus also preferably includes a second spring coupled to the second arm so that the first and second terminal ends are forced directly away from one another.

16 Claims, 4 Drawing Sheets

STEERING WHEEL CENTERING TOOL

BACKGROUND OF THE INVENTION

This invention relates generally to the alignment of wheels on vehicles and more particularly to a method and apparatus for locating a vehicle steering wheel at a centered position so that the vehicle wheels can be aligned when the steering wheel is in a proper position.

During the alignment of vehicle wheels, it is important that the steering wheel of the vehicle be in a centered position before the vehicle wheels are aligned into their calibrated position specified by the manufacturer. Some vehicles are manufactured to have their front wheels in a toe-in position while other vehicles are toe-out. In either case, the wheels are symmetrically situated about the center axis of the vehicle so that the vehicle moves straight forward when the steering wheel is in the centered position and the wheels are properly aligned.

Typically, during alignment operations, a vehicle steering wheel is calibrated by first centering the steering wheel within the vehicle and then aligning the wheels of the vehicle. If the steering wheel is not properly calibrated in a centered position when the vehicle wheels are aligned, later operation of the vehicle with the steering wheels in a centered position will cause the vehicle to turn because the wheels will not be in proper alignment.

One known device for centering a vehicle steering wheel includes a bubble level and an assembly for engaging the molding of the vehicle windshield. The level is aligned with respect to the steering wheel. If the level does not indicate the correct position, the operator adjusts the position of the steering wheel until the level reads correctly. After a correct reading, the operator can indicate that alignment of the wheels should proceed. The usefulness of this apparatus is limited because it relies on human accuracy for reading the level and adjusting the steering wheel to a correct position. This system also does not prevent human error from occurring when the vehicle wheels are aligned prior to the centering of the steering wheel.

There are other more recent devices that serve the same purpose. For example, U.S. Pat. No. 4,342,279 to Seko discloses a device for detecting steering angle and direction. This device includes two contacts which are affixed to a steering column and adapted to be engaged by a movable contact when the steering wheel is turned. Upon contact, a pulse signal is produced and is sent to an electric circuit for detecting rotation.

In another system disclosed in U.S. Pat. No. 4,893,413 to Merrill et al., the apparatus includes a centering unit for sensing the position of the steering wheel with respect to a predetermined centering position. Arms coupled to the centering unit are linked together via cams so that pivotable movement of one arm causes the other to pivot in a symmetrical fashion. Rollers and flanges at the end of each arm abut against the front of a steering wheel on which the device is mounted. The device is installed by spreading the arms until the rollers are spaced to be received in the crotches formed between the spokes and steering wheel. A spring provides a downward biasing force to maintain the device in the installed position. When so mounted, the steering wheel can be moved until the electronic level indicates that the steering wheel is leveled and the wheels subsequently aligned.

Each of these prior art steering wheel centering devices are difficult to use since they require additional mounting means to work with steering wheels of different sizes and spoke configurations.

Accordingly, a need remains for a steering wheel centering device that can be easily adapted for use with a variety of steering wheels.

SUMMARY OF THE INVENTION

The apparatus constructed according to the present invention for positioning a vehicle steering wheel in a centered position comprises an electronic or mechanical leveling device for sensing a deviation in the position of the steering wheel from a centered position and a housing mounted to the vehicle steering wheel for supporting the leveling means. A first arm received in the housing has, at its terminal end, a cam rotatable about a first axis. A second arm received in the housing and coaxial with said first arm has, at its terminal end, a cam rotatable about a second axis parallel to said first axis. In the alternative, the cams are fixed but include a sliding surface adapted to contact and slide along the inner surface of a steering wheel rim when inserted thereagainst. The apparatus includes bias means coupled to the first arm for forcing the terminal end of the first arm away from and in a coaxial direction with the second arm. The apparatus also preferably includes coaxial bias means coupled to the second arm so that the first and second terminal ends are forced directly away from one another.

In use, the leveling device is first calibrated and then the first and second arms are compressed to minimize the distance between the cams located at the terminal ends of the first and second arms. The apparatus is then placed within the steering wheel so that the cams contact the inner surface of the steering wheel rim. The coaxial biasing force acting upon the cams causes the cams to slide or roll downward along the inner surface of the steering wheel until both cams contact that portion where the circular wheel and spokes of the steering wheel intersect to form a crotch. Since most steering wheels are symmetrically formed, the crotches should be located horizontally from each other when the steering wheel is placed in a centered position. When the cams move into symmetric crotches, the steering wheel can then be turned until the leveling device mounted across the housing indicates that the device and corresponding centering apparatus is level.

An apparatus constructed according to the present invention provides several advantages over other known systems. First, the apparatus is self-mounting in that once placed within the steering wheel, the cams of the centering apparatus automatically roll along the inner surface of the steering wheel into their properly mounted positions within the steering wheel crotches. Second, flange surfaces included in the preferred embodiment of the invention allow the apparatus to be mounted on the steering wheel without any supplemental mounting means. Finally, the operation of the device is not dependent upon the size and configuration of the steering wheel and consequently can be used on a variety of vehicles.

The foregoing and other objects, features and advantages of the invention will become more readily apparent from the following detailed description of a preferred embodiment of the invention which proceeds with reference to the accompanying drawings.

DETAILED DESCRIPTION

Figure 1:
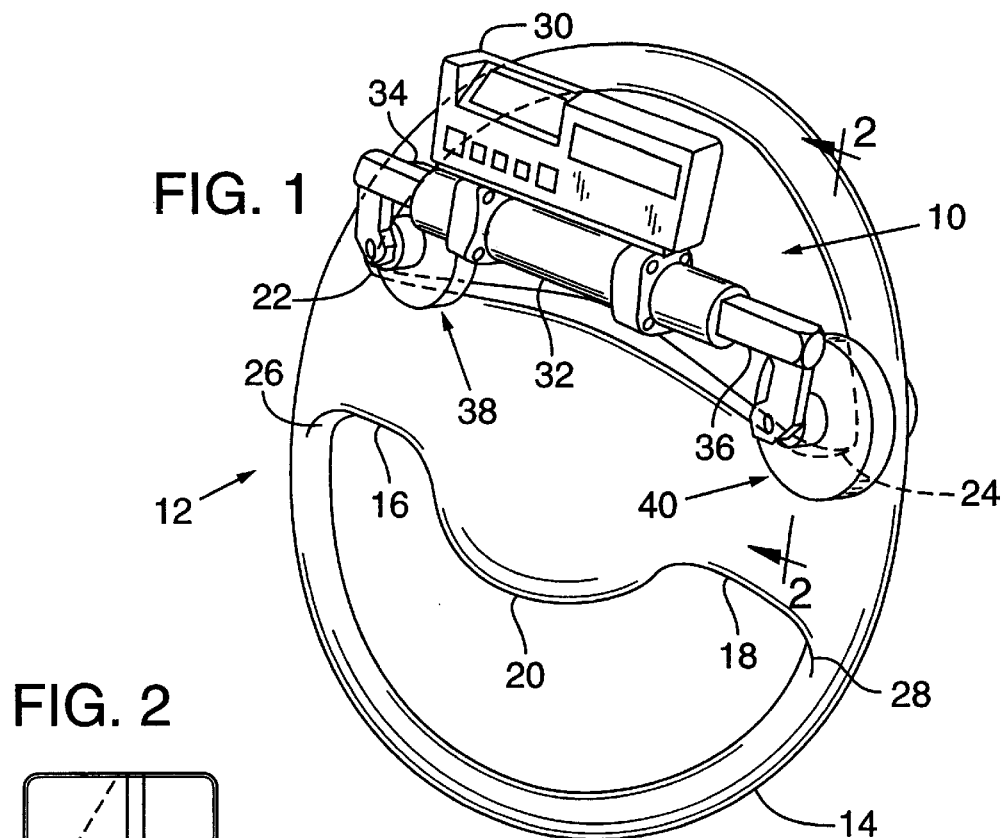
FIG. 1 is a perspective view of the steering wheel centering apparatus constructed according to a preferred embodiment of the invention positioned on a typical steering wheel.

FIG. 1 shows a perspective view of the steering wheel centering apparatus at 10 constructed according to a preferred embodiment of the present invention. The apparatus is shown mounted on a typical steering wheel 12 having a circular rim 14 and two spokes 16,18 connected across a central portion 20 which, together, extend across the rim 14. The intersection of the spokes 16,18 with the rim 14 form a pair of crotches 22,24 on an upper portion of the steering wheel and another pair of crotches 26,28 on a lower portion of the steering wheel. It is understood that steering wheels can take a variety of forms and are not necessarily limited to the configuration shown. However, almost all steering wheels have the basic structures described above and consequently can be centered using the concepts of the invention discussed herein.

Though not shown, a steering column is coupled to the back-side of the central portion 20 of the steering wheel 12. The steering column is connected by linkage to the front wheels of the vehicle so that when the steering wheel is turned clockwise (as by grasping the rim 14), the front wheels turn to the right. When the steering wheel is turned counterclockwise, the front wheels turn to the left. If the steering wheel is properly centered and the vehicle properly aligned, the front wheels of the vehicle should be pointed so that the car moves straight forward.

The apparatus includes an electrical or mechanical leveling device 30 for sensing a deviation in the position of the steering wheel from a centered position. The leveling device 30 is supported on a housing 32 into which first and second slide arms 34,36 are received. Located at the terminal end of each of the arms are cams 38,40 which are adapted to contact and slide or roll along an inner surface of the steering wheel rim 14.

Figure 2:
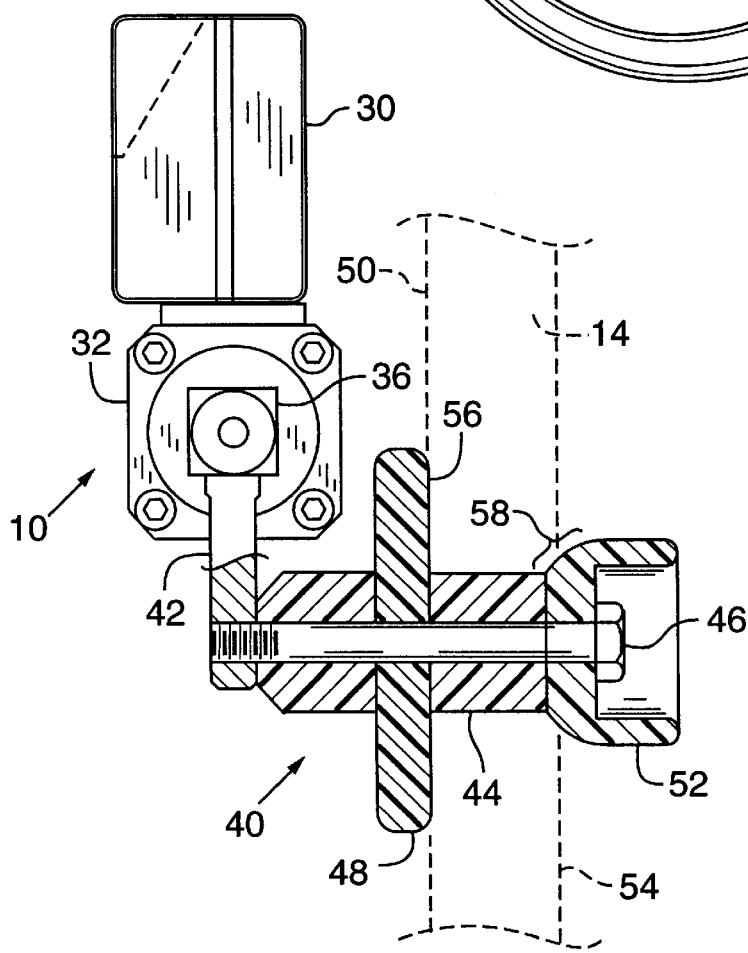
FIG. 2 is a partially sectioned side elevation view of the apparatus of FIG. 1

FIG. 2 is a partially sectioned side elevation view of the apparatus 10 shown in a operative position against a steering wheel rim 14 (shown in dashed lines). The cam 40 is coupled to the terminal end of slide arm 40 via a transverse support member 42.

In its preferred embodiment, the cam comprises a cylindrical roller 44 coupled to the transverse support member 42 via an axially located bolt 46. The cam 40 also includes an outer flange 48, which is adapted to contact the front surface 50 of the steering wheel rim 14, and an inner flange 52, spaced from the outer flange 48, which is adapted to contact the back surface 54 of the steering wheel rim 14. Though the invention can be constructed so that roller 44 and/or flange 52 rotate about the axially located bolt 46, it is preferred that such elements are fixed so that the curved surfaces of roller 44 and flange 52 slide along the steering wheel rim surface instead of roll along it.

Since steering wheel rims vary in width between the front and back surfaces 50,54, it is preferred that either the outer flange or inner flange include a tapered contacting surface. In the embodiment shown in FIG. 1, the outer flange 48 includes a flat contacting surface 56 extending transversely to the radial surface of the cylindrical roller 44. The inner flange 52 includes a tapered contacting surface 58 that extends at an oblique angle to the radial surface of the cylindrical roller 44.

Figure 3:
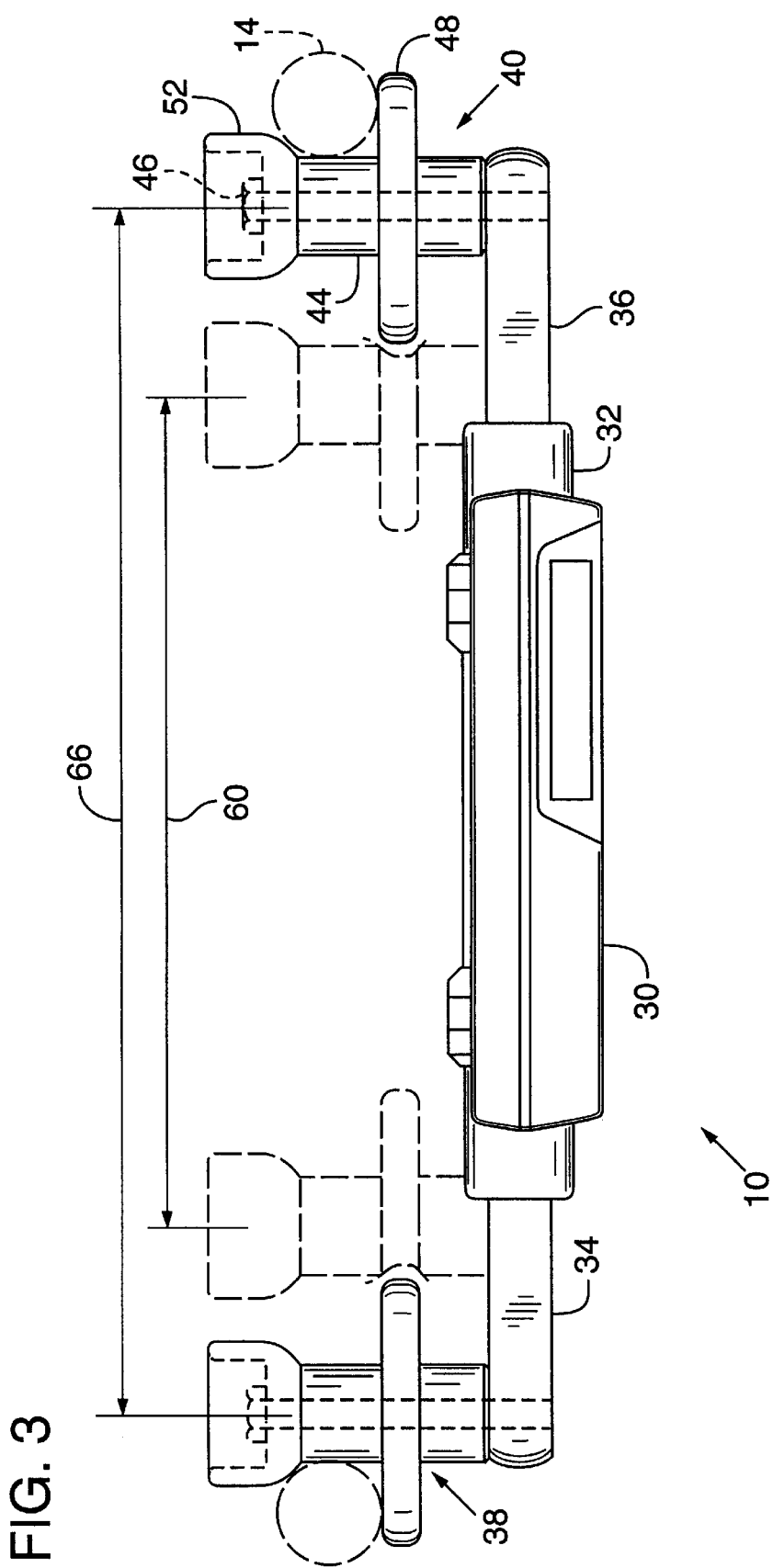
FIG. 3 is a top plan view of the apparatus of FIG. 1 in a compressed position (dashed lines) and an operative, fully extended position.
Figure 4:
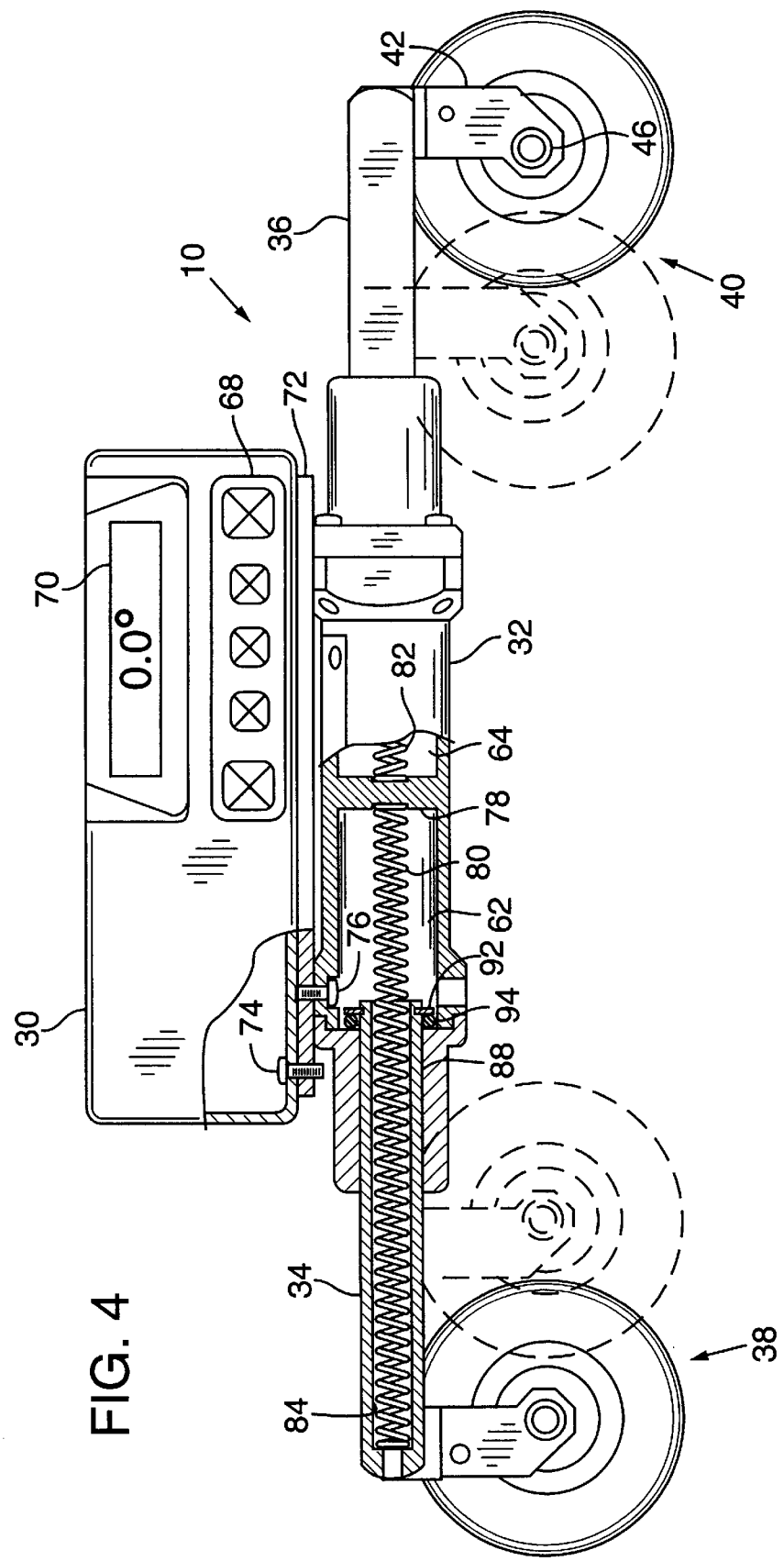
FIG. 4 is a partially sectioned front elevation view of the apparatus of FIG. 1 in a compressed position (dashed lines) and an operative, fully extended position.

FIGS. 3 and 4 illustrate the steering wheel centering apparatus with the arms 34,36 shown in both the fully extended, operative position (solid lines) and in the collapsed, insertion position (dashed lines). Because of the coaxial biasing forces imparted to arms 34,36 by means described in more detail below, the arms are normally disposed in the fully extended position whereby the cams 38,40 are kept apart by a distance 66 between the rotational axes of the cams. The arms 34,36 can be manually compressed so that they slide substantially within coaxial bores 62,64 (see FIG. 4) defined at terminal ends along the longitudinal axis of the housing 32. When the arms are fully compressed, the cams 38,40 are situated apart by a distance 60 measured between the rotational axes of the cams.

FIG. 4 shows a partially sectioned view of the steering wheel centering apparatus 10. The apparatus shown includes an electronic leveling device having a plurality of function buttons 68 and a recessed display screen 70. Examples of functions activated by such buttons 68 include an on/off button, a hold reading button, a volume level button, a calibration button, and a unit change button. The display 70 can display such information as the direction of device tilt, a low battery indicator, a digital display of the degree or percentage from level, and the audio level at which various audible cues are given to indicate level and plumb measurements. To calibrate the device, for example, a user would place the apparatus on a flat surface so that it rests upon cams 38,40. After a short time, the calibrate button is depressed. The apparatus is then flipped around so that it faces the other direction on the flat surface, again resting on cams 38,40. The calibrate button is then depressed for a second time. By taking two readings, the leveling tool can calibrate the device even if the surface upon which the tool is calibrated is flat but not itself perfectly level.

The leveling device 30 is coupled to a mounting plate 72, as via screw 74, which in turn is coupled to the apparatus housing 32, as via screw 76. The housing 32 includes coaxial bores 62,64 defined at terminal ends thereof along the longitudinal axis of the housing. The first and second slide arms 34,36 are received within respective bores 62,64. The bores are separated within the housing by a central wall 78. Springs 80,82 are located within respective bores 62,64 between the central wall 78 and respective slide arms 34,36. Thus situated, the springs 80,82 form the coaxial bias means which forces the arms 34,36 (and terminally located cams 38,40) apart. In its preferred embodiment, the slide arms include a bore for receiving a portion of the spring (such as bore 84 receives spring 80 into arm 34).

Figure 5:
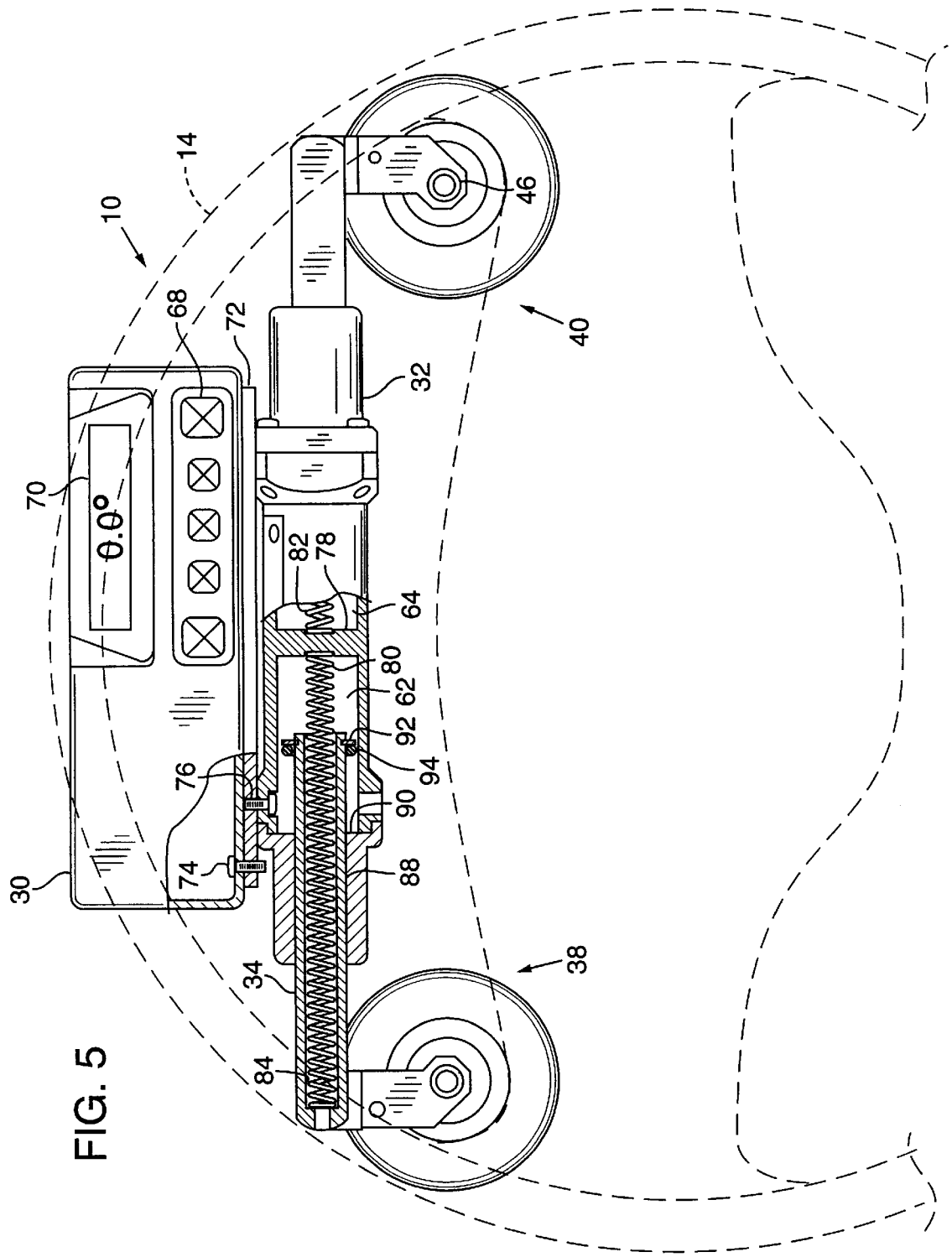
FIG. 5 is a partially section front elevation view of the apparatus of FIG. 1 mounted on a typical steering wheel.

The apparatus preferably includes means for limiting the maximum distance by which the terminal ends of the first and second slide arms are separated. One embodiment of such means is shown in FIGS. 4 and 5 in which each coaxial bore within the housing (such as bore 62) includes a large diameter portion adjacent to the central wall 78 and a smaller diameter counter bore 88 spaced from the central wall. The interface between the larger and smaller diameter bores forms an annular surface 90. A terminal end 92 of the portion of arm 34 received with in the coaxial bore is sized to fit within the larger diameter portion of bore 62 but not within the smaller diameter portion 88. When spring 80 biases arm 34 outward, the terminal end 92 of arm 34 contacts the annular surface 90 at the interface between the larger and smaller diameter bores, thus preventing the arm from extending any further outward. An O-ring 94 can be fixed intermediate the terminal end 92 of the arm and the annular surface 90 so that it contacts and reduces the shock of the terminal end 92 impacting upon the annular surface 90.

FIG. 5 illustrates the steering wheel centering apparatus in operative position between the symmetrically located upper crotches of a typical steering wheel. As shown in the partially sectioned portion of the drawing, the operative, engaging position of spring arm 34 is located only midway between the apparatus' fully collapsed position and the fully extended position as shown in FIG. 4. Accordingly, the terminal end 92 of that portion of arm 34 received in a respective coaxial bore 62 is suspended between the central wall 78 and counterbore annular surface 90 of the bore. The biasing means, such as springs 80,82 continue to exert an outward force, thus pressing the cams 38,40 within the crotches of the steering wheel.

The apparatus constructed according to the present invention is self-mounting in that once the device is inserted within the rim of a steering wheel, the cams slide or roll downward and outward along the upper interior surface of the rim until the cams come to rest within the crotches of the steering wheel. This can be seen in FIG. 5 where the point at which the cylindrical rollers contact the inner surface of the rim (creating a force perpendicular to the surface) is above the level at which the horizontal biasing force exists (creating a horizontal force). By vector addition, it can be seen that the resulting force against the cams results in a downward and outward force which places cams in the proper operative position on the steering wheel.

Having described and illustrated the principles of the invention in a preferred embodiment thereof, it should be apparent that the invention can be modified in arrangement and detail without departing from such principles. For instance, it is understood that only one arm could be springably biased in a direction parallel with the axis separating the two cams. The other arm could be fixedly attached to the housing. Accordingly, I claim all modifications and variation coming within the spirit and scope of the following claims:

We claim:

1. An apparatus for positioning a vehicle steering wheel in a centered position, comprising:

leveling means for sensing a deviation in the position of the steering wheel from a centered position;

a housing adapted to be mounted to the vehicle steering wheel for supporting the leveling means, said housing including holding means for use in engaging differently configured vehicle steering wheels; and wherein said holding means comprises first and second slide arms and coaxial bias means coupled to said first and second slide arms adapted to coaxially bias the first and second slide arms relative to one another.

2. The apparatus, as claimed in claim 1, wherein said first and second slide arms each includes a cam at a terminal end thereof adapted to contact and move along an inner surface of the steering wheel when the apparatus is inserted therein.

3. The apparatus, as claimed in claim 2, wherein said first and second slide arms each includes an outer flange adjacent a terminal end thereof adapted to contact a front surface of the steering wheel when the apparatus is inserted therein.

4. The apparatus, as claimed in claim 3, wherein the first and second slide arms each includes an inner flange spaced from said outer flange, said inner flange adapted to contact and move along a back surface of the steering wheel when the apparatus is inserted therein.

5. The apparatus, as claimed in claim 2, wherein the cams located at the terminal end of the first and second slide arms include inner flange surfaces adapted to contact a back surface of the steering wheel when the apparatus is inserted therein.

6. The apparatus, as claimed in claim 1, wherein the housing includes coaxial bores defined at terminal ends along a longitudinal axis of said housing, each of said first and second slide arms being received in a respective one of said coaxial bores;

a central wall separating said coaxial bores; and a spring located in each of said coaxial bores between the received slide arm and the central wall.

7. The apparatus, as claimed in claim 6, further including means within said bores for limiting the maximum distance by which the terminal ends of the first and second slide arms are separated.

8. An apparatus for positioning a vehicle steering wheel in a centered position, comprising:

leveling means for sensing a deviation in the position of the steering wheel from a centered position;

a first arm having at its terminal end a cam rotatable about a first axis;

a second arm coaxial with said first arm, said second arm having at its terminal end a cam rotatable about a second axis parallel to said first axis; and bias means coupled to the first arm for forcing the terminal end of said first arm away from and in a coaxial direction with said second arm.

9. The apparatus, as claimed in claim 8, wherein said first and second arms each include:

an outer flange adjacent a terminal end thereof adapted to contact a front surface of the steering wheel when the apparatus is inserted therein; and an inner flange spaced from said outer flange, said inner flange adapted to contact and move along a back surface of the steering wheel when the apparatus is inserted therein.

10. An apparatus for positioning a vehicle steering wheel in a centered position, comprising:

leveling means for sensing a deviation in the position of the steering wheel from a centered position;

a first slide arm having a cam at a terminal end thereof;

a second slide arm coaxial with said first arm, said second arm having a cam at a terminal end thereof; and coaxial bias means for forcing the terminal ends of said first and second arm away from one another.

11. The apparatus, as claimed in claim 10, wherein the coaxial bias means includes:

a housing on which said leveling means are mounted, said housing including coaxial bores defined at terminal ends along a longitudinal axis of said housing, each of said first and second slide arms being received in a respective one of said coaxial bores;

a central wall separating said coaxial bores; and a spring located in each of said coaxial bores between the received slide arm and the central wall.

12. The apparatus, as claimed in claim 11, said coaxial bias means further including means within said bores for limiting the maximum distance by which the terminal ends of the first and second slide arms are separated.

13. The apparatus, as claimed in claim 11, wherein said first and second slide arms each includes a cylindrical roller at a terminal end thereof adapted to contact and move along an inner surface of the steering wheel when the apparatus is inserted therein.

14. The apparatus, as claimed in claim 13, wherein the cams located at the terminal end of the first and second slide arms include inner flange surfaces adapted to contact a back surface of the steering wheel when the apparatus is inserted therein.

15. The apparatus, as claimed in claim 11, wherein said first and second slide arms each includes an outer flange adjacent a terminal end thereof adapted to contact a front surface of the steering wheel when the apparatus is inserted therein.

16. The apparatus, as claimed in claim 15, wherein the first and second slide arms each includes an inner flange spaced from said outer flange, said inner flange adapted to contact and move along a back surface of the steering wheel when the apparatus is inserted therein.

* * * * *